Dec. 20, 1949  C. A. WELCH  2,492,078
AIRCRAFT LANDING GEAR CONTROL
Filed Aug. 30, 1947  3 Sheets-Sheet 1

INVENTOR.
Claude A. Welch
BY
Wood Arey, Herron & Evans
ATTORNEYS

Dec. 20, 1949     C. A. WELCH     2,492,078
AIRCRAFT LANDING GEAR CONTROL
Filed Aug. 30, 1947     3 Sheets-Sheet 2

INVENTOR.
Claude A. Welch
BY
ATTORNEYS

Patented Dec. 20, 1949

2,492,078

UNITED STATES PATENT OFFICE 2,492,078

AIRCRAFT LANDING GEAR CONTROL

Claude A. Welch, Deer Park, Ohio

Application August 30, 1947, Serial No. 771,450

7 Claims. (Cl. 200—4)

This invention relates to retractable landing gear for aircraft and is directed particularly to an improved safety control system and switch through which the landing gear is actuated.

In conventional landing gear systems of the type which are now commonly in use, a master control switch is located in the pilot's compartment and a pressure responsive microswitch is located in a wheel oleo or hydraulic shock absorber, the two switches being connected in series with one another so that when both are closed a circuit is completed to a hydraulic pump motor by which the landing gear is either raised or lowered. The pressure responsive switch is maintained in open position by the weight of the aircraft when it is resting on the ground. Thus, when the plane is stationary, the pilot, preparatory to take-off, may throw the master switch to up position but the pressure switch remains open; hence, the circuit to the pump motor is incomplete. However, when the plane becomes airborne, the weight of the plane upon the landing gear is relieved, the pressure sensitive switch is permitted to close, and the hydraulic pump is energized to retract the gear.

In a system of this type, the wheels are lowered by throwing the master switch to down position at which time the circuit to the hydraulic pump motor is completed independently of the pressure responsive switch, and limit switches also are employed to stop the pump motor when the landing gear has reached down or up position. Thus, once the motor has been placed in operation it will continue to operate independently of any switch facilities until the landing gear has been moved to fully up or down position.

While this system is in extensive use in various types of air craft at the present time, it is subject to misoperation which in a number of instances has caused serious accidents. If the pilot throws the master switch to up position preparatory to the take-off, then the entire system is energized through the pressure responsive switch just as soon as the plane leaves the ground. In some take-offs, emergencies occur which necessitate relanding of the plane before it has reached the end of a runway. In other instances, the plane momentarily may leave the ground a few inches, but due to wind or other circumstances the wheels may reengage the ground. By this time, however, the retractive operation has commenced and the knuckle of the landing gear has been partially collapsed to such an extent that the landing apparatus is no longer capable of sustaining the weight load of the plane. As a result, an accident may occur since the pilot is powerless to recommand the system until the pump motor has driven the landing gear to a fully up position.

As a matter of safety and precaution, pilots are instructed to defer the actuation of the master switch to retract the wheels until the take-off has been executed and the plane is fully ariborne. As a matter of experience, however, it has been found that the pilot or co-pilot, each having many other duties to perform during take-off, frequently ignore the instructions and throw the master switch to up position, thereafter relying upon the pressure responsive switch to complete the job.

One of the principal objectives of this invention has been to provide a safety type of switch which is impossible to set in closed or up position until the plane is fully airborne. A further objective of the invention has been to provide a switch having emergency provisions for retracting the landing gear which cannot accidently be operated, but which can, when necessary, be operated by deliberate manipulation. Other objectives and further advantages of the invention are disclosed in the following detailed description of the drawings in which a typical embodiment of the invention is disclosed.

Figure 1:
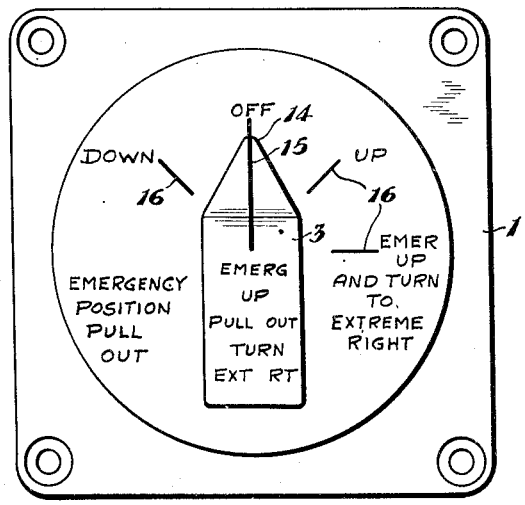
Figure 1 is a front view of the device showing the switch panel which is adapted to be mounted in the pilot's compartment of an aircraft.
Figure 2:
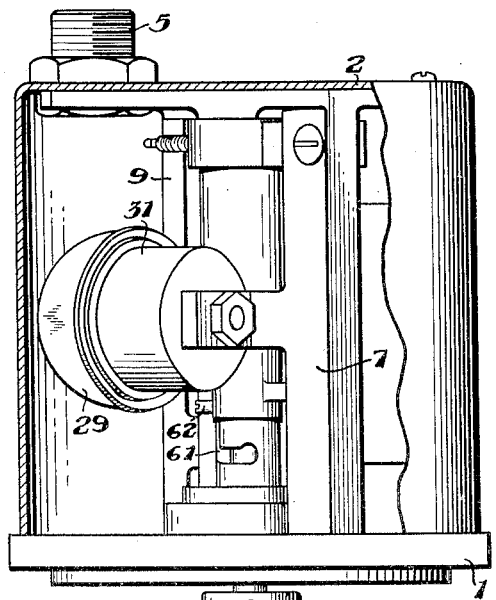
Figure 2 is a top plan view showing a portion of the housing broken away to illustrate the switch structure.

The unit illustrated in the drawings is adapted to be operated in conjunction with a conventional electro-hydraulic system provided with suitable limit switches for controlling the operation of the hydraulic pump motor when the wheels have reached up or down position, and a pressure responsive switch which is arranged to be closed when the plane becomes airborne. Since these details are understood by those skilled in the art, they are not disclosed in this specification.

The apparatus of the present invention is in the form of a self-contained unit comprising a panel 1, a housing or closure 2, and a knob or handle 3. The housing is in the form of a can having its open end seated in a recess in the panel as at 4, and the back wall of the housing is provided with a nipple 5 through which electrical leads may pass to the switch units within the housing.

The front panel of the housing is inscribed with reference marks denoting down, off and up positions and also carries instructions as to manipulation of the handle for emergency operation of the switch.

Support arms 7, 8 and 9 extend rearwardly from the back face of the panel in substantially parallel relationship to one another and are interconnected with one another at their rearward extremities by means of a spider 10 which, residing adjacent the back wall of the housing 2, is appropriately bored and threaded to receive screws 11 which hold the housing in place. The support arms, spider and front panel preferably comprise a one-piece structure such as a casting or forging.

The operating handle 3 is fastened rigidly to a front projection of an operating shaft 12, being locked in place by a set screw 13 in the usual manner. Handle 3 includes a pointer 14 bearing a reference line 15 arranged to align with the several indicating lines 16 inscribed on the face of the panel 1, corresponding to the several operating positions of the switch. Operating shaft 12 actuates a switch actuating arm or cam indicated at 17. A series of switch units indicated at 18, 19 and 20 are secured to the respective arms 7, 8 and 9 by means of screws 21. These switches are arranged in a radius and each includes a spring pressed actuating button 22 adapted to be depressed by the cam 17 to close each switch selectively as the shaft 12 is rotated. These switches are of commercial design, preferably of the type known as microswitches and therefore are not disclosed in detail.

Figure 3:
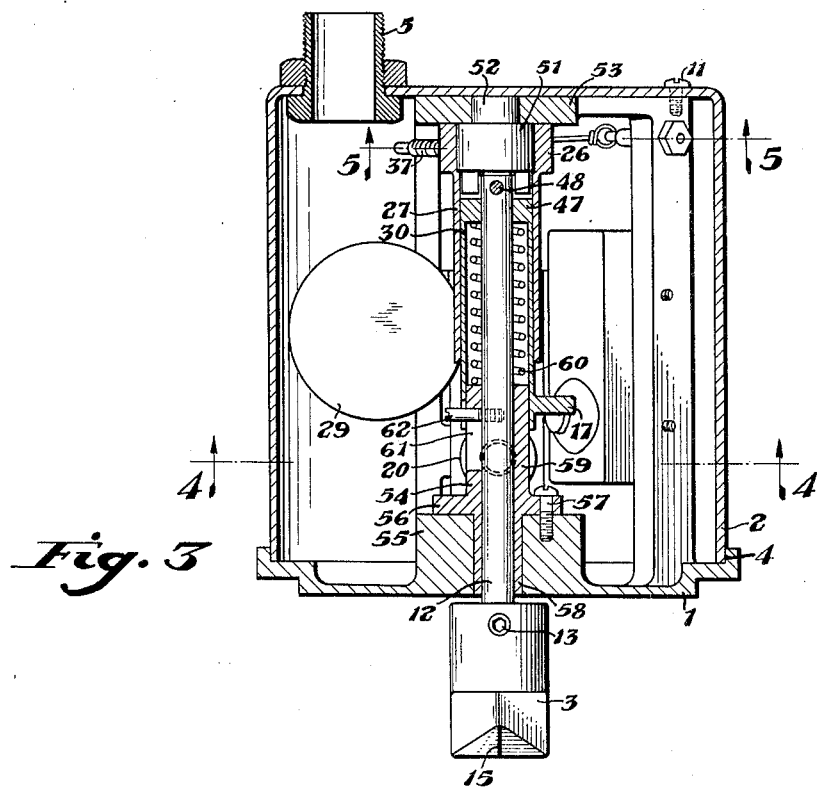
Figure 3 is a longitudinal cross-sectional view through the switch.

Switch 18 is connected in the control circuit to energize the hydraulic system for the landing gear in the down direction and switch 19 is arranged to actuate the landing gear in the up or retracting direction. The actuating cam 17 in normal position is arranged to engage the switches 18 or 19 alternately. For this purpose these two switches are arranged in longitudinal alignment with the cam 17 as shown in Figure 3. Microswitch 20 however constitutes an emergency up direction switch and is arranged to be actuated only under abnormal or emergency conditions. For this purpose switch 20 is disposed in a plane longitudinally forward of the cam 17 so that the cam does not contact the actuating button 22 of this switch unless the cam is shifted longitudinally into alignment with actuating button of switch 20. Therefore in order to actuate the emergency switch 20, it is necessary for the operator to pull out handle 3 thereby pulling the actuating cam 17 into alignment with the button of switch 20 as hereinafter disclosed.

Figure 4:
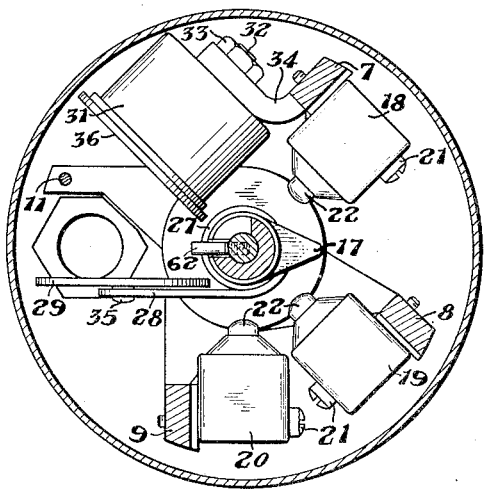
Figure 4 is a transverse sectional view taken on the line 4—4 of Figure 3.

Under normal conditions of operation, the landing gear is controlled by turning the operating handle to a position aligning the reference line 15 with the proper graduation 16 indicating either off, down or up actuation of the landing gear. As shown in Figure 4 the switch is in off or neutral position with all of the microswitches open. It will be apparent that shifting the actuating handle 3 to the left will close switch 18 for lowering or extending the landing gear, and rotating the handle to the right will actuate switch 19 to cause retraction of the landing gear.

Described in detail, the actuating mechanism which interconnects the shaft 12 with the switch actuating cam 17, comprises a pair of sleeves telescopically disposed one over the other with the operating shaft 12 extending centrally therethrough. The outer or holding sleeve 27 includes a tangentially extended arm 28 upon which is mounted an armature disk 29 arranged to cooperate with an electromagnet 31 and the inner sleeve 30 carries the switch operating arm 17 previously noted. Electromagnet 31 is securely fastened by means of screw 32 and nut 33 to finger 34 which is formed integrally with arm 7 and extends angularly thereof.

As shown in Figure 4 the armature disk 29 is arranged to swing in an arc relative to the electromagnet 31. Armature 29 is formed of a suitable grade of magnetic iron or steel and is secured to arm 28 by means of a rivet 35 secured at the center of the disk and passing through the outer end of the arm 28. The rivet mounting of the disk preferably permits rotation of the disk relative to the arm and permits a slight lateral tilting of the disk so that the disk is free to float in seating upon the face 36 of the electromagnet 31.

The electromagnet 31 preferably is of commercial design, cylindrical in form, the outer shell 31 forming one pole and an inner concentric pole piece forming the opposite pole, with a coil disposed between the inner and outer poles. When armature 29 is positioned in holding position with the coil energized, a magnetic circuit is completed by the armature between the inner and outer poles to hold the armature firmly in position. The electromagnet coil is connected with a pressure responsive switch associated with the hydraulic shock absorber or the landing gear. The circuit is arranged so that the electromagnet is energized only when the plane is airborne, thus when the plane is on the ground with its weight resting upon the landing gear, the pressure responsive switch is in open position and the electromagnet 31 deenergized.

Figure 7:
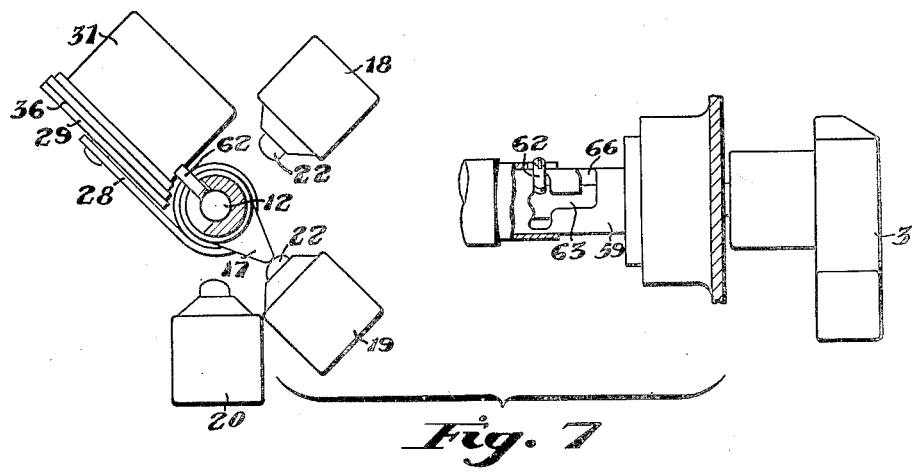

The inner end of sleeve 27 includes a hub 26 and this hub carries a screw 37 to which is connected a tension spring 38 having its opposite end anchored upon a screw 39 passing through the spider arm 8 and secured by nuts 40. Tension spring 38 tends to rotate the sleeve 27 counterclockwise, as viewed from the front, thereby holding the switch in the off position. A detent device, hereinafter disclosed, locks the sleeve in this position. When the actuating knob 3 is rotated clockwise to its up position, the sleeve therefore will immediately be returned to an off position unless the electromagnet 31 is energized magnetically to hold the armature disk 29. Therefore actuation of the switch to up position is ineffective unless the electromagnet is energized to hold the sleeve 27 against the tension of spring 38, thereby to hold the actuating cam 17 in its closing position with respect to the up switch 19 as shown in Figure 7. After electromagnet 31 is deenergized the tension spring 38 will immediately rotate the sleeve 27 to return cam 17 to its off position as shown in Figure 4.

Figure 5:
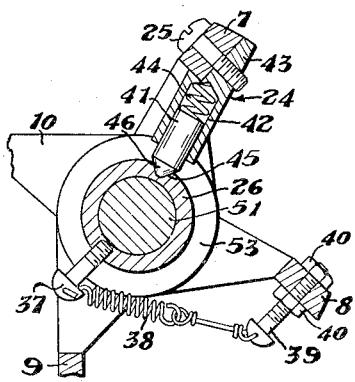
Figure 5 is a sectional view showing a detail of construction of the detent mechanism of the switch as taken on the line 5—5 of Figure 3 with the switch in neutral or off position.

Referring to Figure 5 it will be noted that a detent mechanism indicated generally at 24 is secured to the spider arm 7 by means of a screw 25. This detent engages a recess formed in the hub 26, constituting a part of holding sleeve 27. The detent serves to hold the mechanism normally in the neutral or off position as shown. The detent 24 is in the form of a plunger 41 slidably disposed in the bore 42 of a block 43. A compression spring 44 is in compression between the inner end of plunger 41 and the end of bore 42 to urge the plunger into engagement with the recess 45 formed in hub 26. The recess 45 and the tip 46 of the plunger are tapered so as to permit the plunger to be sprung out of engagement recess when knob 3 is rotated.

Figure 8:
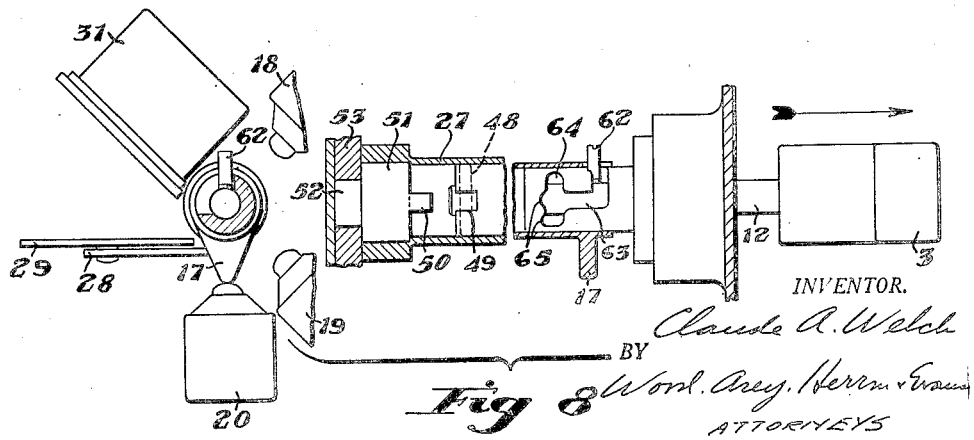

As shown in Figures 3 and 8, the rearward end of the switch actuating sleeve 30 is provided with a base portion 47 through which a pin 48 extends to anchor the sleeve to the actuating shaft 12. The base portion 47 as shown in Figure 8 further includes a keyway 49 engageable with a key 50 formed upon an end plug 51 non-rotatably pressed or otherwise secured into the end of the holding sleeve 27. The plug 51 also includes a stub shaft 52 which is rotatably journalled in a hub portion 53 of the spider 10 thereby providing a bearing for the inner end of the assembly. In normal position the keyway 49 is engaged upon key 50 therefore the sleeves 27 and 30 rotate unitarily. When the actuating knob 3 is withdrawn, as shown in Figure 8, the switch actuating sleeve 30 is retracted so as to disengage the keyway 49 from the key 50, thereby permitting the switch actuating sleeve to be rotated independently of the holding sleeve 27.

Referring to Figure 3, the forward end of actuating shaft 12 is journalled in a bushing 54 seated upon a boss 55 forming a part of and extending inwardly from the dial plate or panel 1. Bushing 54 includes a flange 56 in facial engagement of the inner surface of boss 55 and secured thereto by means of screws 57. The bushing further is provided with a sleeve portion 58 seated in a bore formed through the boss 55. The inner end of the bushing 54 includes a sleeve 59 which provides a bearing for the forward end of the switch actuating sleeve 30 as shown.

Between the end of sleeve 59 and the base portion 47 of the switch actuating sleeve 30, there is provided a compression spring 60 which normally maintains sleeve 30 in its retracted position with the keyway 49 engaged upon key 50 to provide unitary rotation of the switch actuating sleeve 30 and the holding sleeve 27. When the actuating knob 3 is withdrawn for emergency operation, as shown in Figure 8, spring 60 is compressed.

Figure 6:
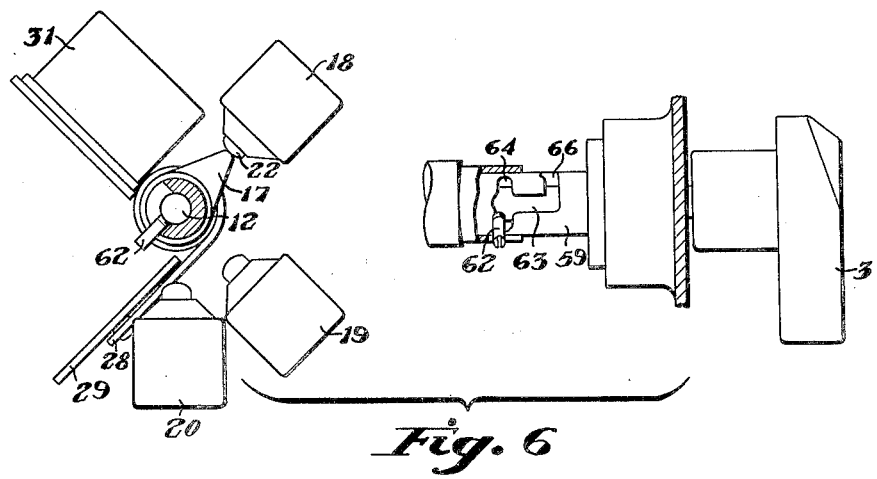
Figures 6, 7 and 8 are somewhat diagrammatic views showing the relationship of the parts when the switch is thrown respectively to down, up and emergency up positions.

The sleeve 59 of bearing bushing 54 is provided with a slot generally indicated at 61 through which extends a stud 62 having its inner end in screwthreaded engagement with the actuating shaft 12. Slot 61 generally may be described as a T-shaped slot, having a longitudinal portion 63 and a lateral extension 64 running in opposite directions. This lateral portion is provided with notches 65 formed in its inner surface so as to engage the stud 62. These notches provide a detent latching effect by operation of compression spring 60 when the actuating knob is in either the down or off position as shown in Figures 4 and 6. The right hand portion of the lateral extension 64, which corresponds to the up position, is straight so that the stud 62 is not latched in this position. This arrangement permits the tension spring 38 to return the actuating shaft assembly and cam 17 to the off position when the holding magnet is deenergized.

It will be apparent therefore that the T-portion 64 of the slot is effective during normal operation of the switch to permit the switch to be set either in its down, off, or up position. The notches 65 cooperate with the stud 62 and serve to index and latch the knob and cam 17 in either off or down position. The stud serves also as a limit between the down and the up positions so that normally it is impossible to rotate the knob beyond the down or up positions.

It will be noted in Figure 8 that the forward end of the longitudinal slot 63 is provided with a lateral extension 66 running toward the right, as viewed from the front. The purpose of this extension is to permit actuation of the selector switch to the emergency up position. When it is necessary to set the switch in emergency position, actuating knob 3 is pulled outwardly thereby withdrawing actuating shaft 12 and switch actuating sleeve 30 outwardly. In order to withdraw the actuating knob the knob must be in its off position in which position the stud 62 is aligned with the longitudinal portion 63 of the slot. Therefore when the knob is withdrawn, the stud 62 traverses the slot longitudinally to the outer end at which time it is in alignment with the lateral extension 66, which permits the knob to be turned to the extreme right or emergency up position. As shown in Figure 3 the emergency up switch is displaced longitudinally toward the outer end of the switch unit and when the stud 62 is engaged in the lateral extension 66, actuating cam 17 is in alignment with actuating button 22 of switch 20. Therefore when the actuating knob 3 is rotated to the right the stud 62 traverses the lateral extension 66 of the slot to a position for closing the emergency up switch as illustrated in Figure 8.

Describing briefly the operation of the selector switch, it is shown in its off position in Figures 1 and 4 at which time the actuating cam 17 is positioned midway between the down and up switches 18 and 19. As previously noted the control system for the landing gear includes a pressure responsive switch which conditions the circuit for operation when the landing gear is relieved of the weight of the plane, as when the plane is in flight. The down switch 18 is in series with this pressure responsive switch so that upon closing the switch 18 by rotating the knob to the down position, the motor for the hydraulic system is operable to lower or extend the landing gear. When the landing gear lowering operation is initiated, the switch may be returned to its off position, since the landing gear circuit includes suitable holding and limit switches to cause the operation to continue automatically until the gear is fully lowered. The control system conventionally is equipped with signal lamps or other means to indicate when the landing mechanism is in lowered position.

In the take-off of the plane, pilots normally are instructed to defer actuating the selector switch for retraction of the wheels until the take-off has been safely executed and the plane fully airborne. With the control apparatus presently in use the pressure responsive switch of the landing gear is capable of preventing actuation of the motor which operates the hydraulic system for retraction. However, in spite of the landing gear switch accidents occasionally occur due to premature operation of the retraction switch. For example, the plane momentarily may leave the ground but due to flying conditions the wheels may reengage the ground after the landing gear has partially collapsed so that the apparatus no longer is capable of sustaining the weight of the plane.

The present apparatus prevents a mishap of this nature since it is impossible to preset the master switch to a retracting position until the plane is airborne. In other words should the pilot actuate the knob to up position while the plane is still on the ground, the pressure responsive switch in the landing gear will be in open position. Therefore the circuit through up switch 19 will be incomplete to initiate the retracting operation. The electromagnet 31 also is deenergized since this magnet also is energized only when the weight of the plane is off the landing gear. Electromagnet 31 may be energized through the same pressure responsive switch which is in series with the up switch 19 or it may be controlled in the same manner through a secondary pressure responsive switch in the landing gear. It will be apparent therefore that when the actuating knob is turned to the up position while the plane weight is still on the wheels, the circuit to the hydraulic system is incomplete, and the electromagnet being deenergized, the actuating knob will return immediately to off position by virtue of tension spring 38.

If the plane is safely airborne at the time the switch is actuated to up position, the pressure responsive switch or switches will have conditioned the circuit for up operation of the hydraulic system and the electromagnet 31 will be energized. Therefore, armature 29 will be held in position against the face of electromagnet 31, biasing the tension of spring 38, to make the switch self-holding in the up position until the retracting operation is complete. The control system preferably includes a suitable limit switch to deenergize electromagnet 31 when the operation is completed, thereby permitting the switch to return to its off position by operation of tension spring 38 after the gear is fully retracted.

Should an emergency develop during the take-off or landing, for example, should the plane be unable to clear the end of the runway or field, it may be necessary to retract the wheels to execute a "belly landing" in order to avoid a collision, since in such instances the plane frequently is moving at a rate of speed which would render the wheel braking system ineffective to avoid disaster. In an emergency of this kind the wheels may be retracted by pulling out the actuating knob 3 and rotating the switch to the right into emergency up position. This operation permits the emergency up switch to be operated as previously described and as illustrated in Figure 8. Since the emergency up switch 20 is connected in a circuit completely independent of the pressure responsive control system actuation of switch 20 causes immediate operation of the hydraulic system to retract the wheels, even though the weight of the plane may still be carried upon them. The wheels therefore immediately will be retracted and the plane will skid to a stop upon its fuselage.

The emergency up switch is intended likewise to be utilized in instances where the normal control system for some reason or another has become inoperative. Thus, should the landing gear fail to retract due to some derangement in the control system, the pilot may pull out the actuating knob and retract the wheels by energizing the independent control system. It will be apparent therefore that the selector switch prevents premature retracting of the landing gear during take-off and also permits emergency control of the gear should the normal control system fail.

Having described my invention, I claim:

1. A selector switch for controlling the landing gear of aircraft or the like comprising: a frame, a plurality of switch elements carried by said frame, a switch actuating member arranged selectively to actuate said switch elements, an electrically operated holding device associated with said switch actuating member and arranged to hold the member in a switch engaging position when the holding device is energized and spring means arranged to disengage the actuating member when the holding device is deenergized, a supplemental switch for operation independently of said first mentioned switches, and a coupling device between said switch actuating member and said holding device arranged to permit the actuating member to be operated independently of the holding device to permit engagement with the supplemental switch.

2. A switch for controlling the operation of the landing gear of aircraft and the like comprising; a switch frame, an actuating shaft having a hand operated member secured thereon, a switch actuating arm controlled by movement of said shaft, a plurality of switches for operating the landing gear, said switch actuating arm adapted to engage said switches selectively by rotating said actuating shaft, a holding element associated with said actuating shaft, means associated with said holding element to lock said holding element and actuating shaft in an operating position, connecting means arranged to cause unitary rotation of said switch actuating shaft and said holding element during normal operation of the selector switch, an emergency switch unit removed from the plane of said first mentioned switches, said switch actuating arm arranged to be shifted into alignment with said emergency switch unit whereby said connecting means between the holding element and switch actuating arm is disengaged to permit the switch actuating arm to be rotated independently of the holding element.

3. A selector switch for controlling the operation of the landing gear for aircraft or the like comprising; a switch frame, a pair of switch units arranged for normal up and down actuation of said landing gear, an actuating shaft journalled in said switch frame, a switch actuating arm selectively engageable with said switch units by rotating said actuating shaft, a sleeve secured to said switch frame providing a bearing for said actuating shaft, said sleeve having a slot and said actuating shaft having a stud member engaged in said slot to limit the rotation of the switch actuating shaft, to limit the movements of said actuating arm relative to said switch units, an emergency switch secured to said switch frame, said emergency switch disposed in a longitudinal plane removed from the plane of said first mentioned switches, said slot including a longitudinal extension permitting said actuating shaft to be displaced longitudinally to align said switch actuating arm with said emergency switch, said longitudinal slot including a lateral extension permitting the switch actuating arm to be rotated to a position beyond the normal limits of operation and locked in engagement with said emergency switch.

4. A selector switch for controlling the operation of the landing gear of aircraft and the like comprising; a switch frame, an actuating shaft having a hand operated member secured thereon, a switch actuating sleeve connected to said shaft, a switch actuating arm carried by said sleeve, a pair of switches secured to said switch frame for raising and lowering the landing gear, said switch arm adapted to engage said switches selectively by rotating said actuating shaft, a holding sleeve telescopically engaged over said switch actuating sleeve, disengageable connecting means between said holding and actuating sleeves to cause unitary rotation of said sleeves during normal operation of the selector switch, electromagnetic means associated with said holding sleeve to hold the same in switch closing position, an emergency switch unit secured to said switch frame, said emergency switch unit disposed in a plane removed from the plane of said first mentioned switches, said switch actuating shaft and sleeve arranged to be shifted into alignment with said emergency switch unit whereby said connecting means between the holding sleeve and the switch actuating sleeve is disengaged to permit the switch actuating sleeve to be rotated independently of the holding sleeve beyond the normal limit of travel.

5. A selector switch for controlling the operation of the landing gear of aircraft and the like comprising; a switch frame, an actuating shaft having a hand operated member secured thereon, a switch actuating sleeve connected to said actuating shaft, a switch actuating arm carried by said sleeve, a pair of switches secured to said switch frame for raising and lowering the landing gear, said switch actuating arm adapted to engage said switches selectively by rotating said actuating shaft, a holding sleeve telescopically engaged over said switch actuating sleeve, an electromagnet secured to the frame of said switch, an armature carried by said holding sleeve arranged to cooperate with said electromagnet, connecting means arranged to cause unitary rotation of said switch actuating sleeve and said holding sleeve during normal operation of the selector switch, an emergency switch unit secured to said switch frame and disposed in a plane forwardly of said first mentioned switches, said switch actuating shaft and sleeve arranged to be shifted forwardly into alignment with said emergency switch unit whereby said connecting means between the holding sleeve and the switch actuating sleeve is disengaged to permit the switch actuating sleeve to be rotated independently of the holding sleeve beyond the normal limit of rotation permitted by said armature.

6. A selector switch for controlling the operation of the landing gear of aircraft or the like comprising; a switch frame, a shaft, a switch actuating sleeve connected to said shaft, a switch actuating arm carried by said switch actuating sleeve, a pair of switches secured to said switch frame for extending and retracting the landing gear, said switch arm adapted to engage said switches selectively by rotating said shaft, a holding sleeve telescopically engaged over said switch actuating sleeve, an electromagnet secured to the switch frame, an armature carried by said holding sleeve arranged to cooperate with said electromagnet, a keyway in the end of said switch actuating sleeve, a key cooperating with said keyway secured in said holding sleeve and arranged to cause unitary rotation of said switch actuating sleeve and said holding sleeve during normal operation of the selector switch, a compression spring arranged to urge said key members into engagement, an emergency switch unit secured to said switch frame, said emergency switch unit disposed in a plane forwardly of said first mentioned switches, said shaft and switch actuating sleeve arranged to be moved forwardly into alignment with said emergency switch unit whereby said key members between the holding sleeve and the switch actuating sleeve are disconnected to permit the switch actuating sleeve to be rotated independently of the holding sleeve beyond the normal limit of rotation permitted by said armature.

7. A selector switch for controlling the operation of the landing gear for aircraft or the like comprising; a switch frame, a plurality of switch units arranged for actuation of said landing gear, an actuating shaft journalled in said switch frame, a switch actuating arm selectively engageable with said switch units by rotation of said actuating shaft, a sleeve secured to said switch frame providing a bearing for said actuating shaft, said sleeve having a slot and said actuating shaft having a stud member engaged in said slot to limit the rotation of the switch actuating shaft to thereby position said actuating arm in engagement respectively with said switch units, said slot having a series of notches engageable by said stud to index said switch actuating arm relative to said switches, a spring element associated with said actuating shaft to urge said stud in engagement with said notches, an emergency switch secured to said switch frame, said emergency switch disposed in a longitudinal plane removed from the plane of said first mentioned switches, said slot including a longitudinal extension permitting said actuating shaft to be displaced longitudinally to align said switch actuating arm with said emergency switch, and said longitudinal slot including a lateral extension permitting the switch actuating arm to be rotated to a position beyond the normal limits of operation to engage said emergency switch.

CLAUDE A. WELCH.

REFERENCES CITED

The following references are of record in the file of this patent:

UNITED STATES PATENTS

| Number | Name | Date |
|--------|------|------|
| 828,288 | Cushman | Aug. 14, 1906 |
| 1,780,703 | Dunlop | Nov. 4, 1930 |
| 1,887,883 | Churcher | Nov. 15, 1932 |
| 2,122,643 | Golemb | July 5, 1938 |
| 2,252,245 | Benson | Aug. 12, 1941 |